Jan. 19, 1926.
E. E. LOVERING
1,569,990
FEED BOX
Filed Nov. 17, 1924
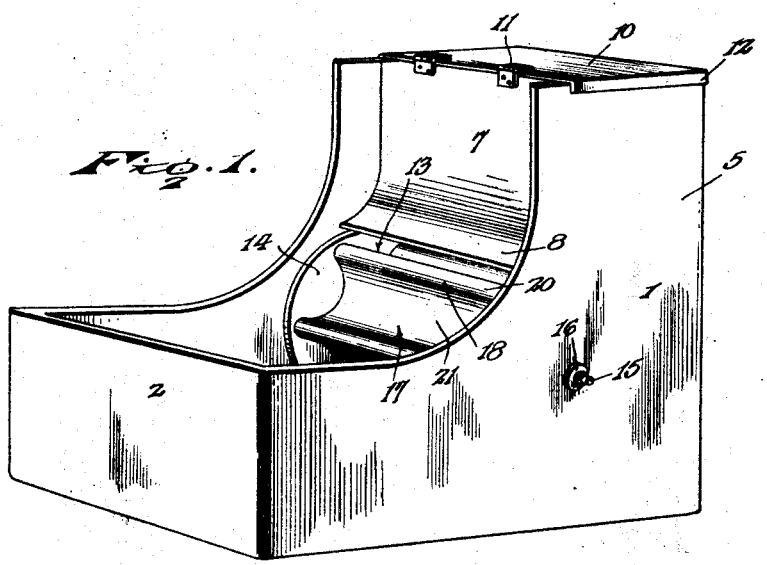
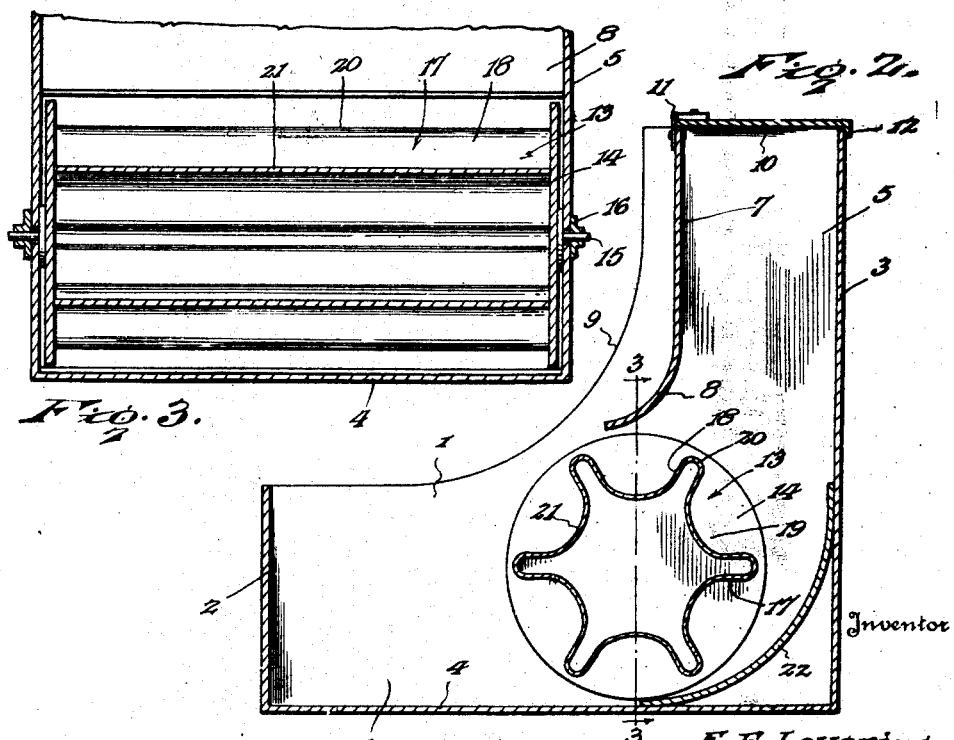

Patented Jan. 19, 1926.

1,569,990

UNITED STATES PATENT OFFICE.

ERSUL E. LOVERING, OF WATFORD CITY, NORTH DAKOTA.

FEED BOX.

Application filed November 17, 1924. Serial No. 750,395.

*To all whom it may concern:*

Be it known that I, ERSUL E. LOVERING, a citizen of the United States, residing at Watford City, in the county of McKenzie and State of North Dakota, have invented certain new and useful Improvements in Feed Boxes, of which the following is a specification.

This invention relates to improvements in feed boxes for supplying feed in regulated quantities to horses and cattle.

One of the objects of the present invention is to provide a feed box which may be manufactured at low cost and which will be simple in construction and not liable to any disarrangement of its parts because of rough usage to which it may be subjected, and which box will embody means for delivering feed from the source of supply to the trough of the box in sufficient quantity to satisfy the wants of the animals to be fed and yet not in such quantity as would likely result in a waste of the feed.

Another object of the present invention is to provide means, in a feed box of the type referred to, for effectually protecting the supply of feed from contamination prior to its delivery to the trough of the box, so that the feed will be delivered in a fresh and palatable form for consumption.

Another object of the invention is to so construct and arrange the delivery means that the animals cannot gain access to the storage compartment of the box, the arrangement of the feeding device being such that any effort on the part of the animals to reach the storage supply will result in a regulated quantity of feed being delivered to the trough of the box where it may be consumed, the device being, therefore, of a nature to require no attention on the part of the owner, except to replenish the storage supply as occasion may require.

In the accompanying drawings:

Figure 1 is a perspective view of the feed box embodying the invention.

Figure 2 is a vertical front to rear sectional view through the said box.

Figure 3 is a vertical transverse sectional view taken substantially on the line 3—3 of Figure 2, looking in the direction indicated by the arrows.

The feed box embodying the present invention is preferably made of heavy sheet metal and comprises side walls 1, a front wall 2, a rear wall 3, and a bottom 4. The rear wall 3 is considerably higher than the front wall 2, and the side walls 1 at their rear portions are provided with upward extensions indicated by the numeral 5, so that the box is of greater height at its rear portion than at its front, the front portion of the box being open at its top and constituting a trough which is indicated by the numeral 6, and into which trough the feed is to be delivered in regulated quantities from the storage hopper of the box which comprises the upward extensions of the side and rear walls of the box and a wall which is indicated by the numeral 7 and which extends between the forward portion of the upward extensions 5 of the side walls and from the upper ends of these extensions downwardly to a point slightly spaced above the open upper side of the trough 6. The lower portion of the front wall 7 of the hopper is curved forwardly and downwardly as indicated by the numeral 8, and, preferably, the upper and forward edges of the walls 1 and their extensions 5, respectively, are merged along a curved line, as indicated by the numeral 9. The numeral 10 indicates a cover for the open top of the hopper of the box and this cover is hinged at its forward side as at 11 to the upper side of the front wall 7 of the hopper and is adapted to rest upon the upper edges of the extensions 5 of the side walls and the upper edge of the rear wall 3, the cover being preferably provided with a marginal depending flange 12 adapting the cover to fit substantially tight about the top of the hopper.

The delivering means for delivering feed from the hopper into the trough is indicated in general by the numeral 13, and the same comprises a drum having circular heads 14 provided upon their outer faces with trunnions 15 which are rotatably mounted in suitable bearings 16 secured upon the side walls 1 of the device, the bearings being located below and slightly in the rear of the forward edge of the deflected lower portion 8 of the wall 7 of the hopper. The body of the drum, which is indicated in general by the numeral 17, is formed of sheet metal and is hollow, and secured at its ends to the inner faces of the heads 14 and thus supported between the said heads, and the said body of the drum is so formed as to provide a plurality of radially projecting longitudinally extending blades 18 and intervening substantially U-shaped pockets 19, the metal of which the body of the drum is formed being corrugated in order to produce the said blades and pockets, and the blades being of hollow construction and at their outer edges being somewhat rounded, as indicated by the numeral 20, so as to obviate any sharp corners which might cause injury to the animals feeding from the trough. The walls of the hollow blades are substantially parallel to each other, in the instance of each blade, as clearly shown in Figure 2 of the drawings, whereas adjacent walls of adjacent blades are divergent, and it will be observed, also by reference to the said figure, that the bottom or inner walls of the pockets are gradually rounded as at 21, so that feed collected therein will be readily discharged therefrom and there will be no likelihood of any of the feed lodging in the bottoms of the pockets. By reference to Figure 2, and likewise to Figure 3, it will be observed that the drum 13 is so mounted that, in its rotation, the rounded outer ends of the blades 18 will pass relatively close to and beneath the forwardly curved lower portion 8 of the front wall 7 of the hopper and that, consequently, there is no possibility of the animals reaching the feed within the hopper between these parts.

In order that the feed may be prevented from lodging in the bottom of the hopper and packed therein, and likewise in order that it may be more readily delivered from the hopper into the trough in the rotation of the drum 13, the said hopper is preferably provided with a false bottom indicated by the numeral 22, and this false bottom is preferably of sheet metal and is secured at its upper edge to the inner face of the rear wall 3 of the box and is turned downwardly and forwardly to a point beneath the drum 13 and secured at its forward edge to the upper side of the bottom 4 of the box. The curvature of the false bottom 2 is such that the bottom is eccentric to the circle touched by the outer edges of the blades 18, and, consequently, feed will freely accumulate in the pockets of the drum without any likelihood of clogging or packing.

From the foregoing description of the invention, it will be understood that the animals, in attempting to reach the feed will rub their muzzles against the blades of the drum and thus cause the drum to rotate, whereupon feed will be delivered from the pockets of the drum into the trough 6, where it will attract the attention of the animals and may be readily consumed without further attempt on their part to gain access to the feed within the hopper of the device. If the grain or other feed first delivered does not satisfy the appetite of the animals, they will, of course, again endeavor to reach the supply within the hopper, thus again rotating the drum and effecting a further delivery of the feed.

Having thus described the invention, what I claim is:

1. A feed box having a bottom, and side, front and rear walls, a partition wall extending between the side walls in advance of the rear wall and defining, in conjunction therewith, a feed hopper, the portion of the box in advance of the partition wall constituting a feed trough, a freely rotatable drum mounted between the side walls below the lower edge of the partition wall and at the lower front of the hopper and having a circumferential series of feed collecting pockets to collect the feed from the hopper and deliver the same to the trough during rotation of the drum, and a guide plate in the lower rear portion of said hopper extending between the side walls thereof and having its upper edge portion secured to the rear wall of the hopper, said guide being curved downwardly and forwardly in converging relation to the drum and having its lower portion extending beneath the drum in close proximity thereto and secured to the bottom of the hopper.

2. A feed box having a bottom, and side, front and rear walls, a partition wall extending between the side walls in advance of the rear wall and defining, in conjunction therewith, a feed hopper, the portion of the box in advance of the partition wall constituting a feed trough, a freely rotatable drum mounted between the side walls below the lower edge of the partition wall and at the lower front of the hopper and having a circumferential series of feed collecting pockets to collect the feed from the hopper and deliver the same to the trough, in the rotation of the drum, and a false bottom extending from the rear wall, in rear of the drum, downwardly and forwardly along a curved line, to the upper side of the bottom of the box at a point beneath the said drum, whereby to direct the feed toward the drum as it is delivered from the hopper, the line of curvature of the false bottom being eccentric to the periphery of the drum and the upper end of the said false bottom being more remote from the drum.

3. A feed box having a bottom, and side, front and rear walls, a partition wall extending between the side walls and in advance of the rear wall and defining, in conjunction therewith, a feed hopper, the portion of the box in advance of the partition wall constituting a feed trough, and a freely rotatable drum mounted between the side walls below the lower edge of the partition wall and at the lower front of the hopper and having a circumferential series of feed collecting pockets to collect feed from the hopper and deliver the same to the trough, in the rotation of the drum, the lower portion of the partition wall being curved forwardly and downwardly in the direction of the trough and above the upper side of the said drum.

4. A feed box having a bottom, and side, front and rear walls, a partition wall extending between the side walls in advance of the rear wall and defining, in conjunction therewith, a feed hopper, the portion of the box in advance of the partition wall constituting a feed trough, and a freely rotatable drum mounted between the side walls below the lower edge of the partition wall and at the lower front of the hopper, the said drum comprising a sheet metal body formed to provide hollow radial blades the walls of which are substantially parallel to each other, the adjacent walls of adjacent blades being radially divergent and connected at their inner portions by a relatively gradually curved portion of the sheet metal whereby a circumferential series of pockets are provided about the drum having relatively wide open outer sides and relatively broad concave bottoms, the pockets constituting means for collecting feed from the hopper to deliver the same to the trough, in the rotation of the drum.

In testimony whereof I affix my signature.

ERSUL E. LOVERING. [L. S.]